Aug. 9, 1966   F. M. SIPTROTT   3,264,827
HYDRO-CENTRIFUGAL POWER UNIT
Filed March 15, 1965   2 Sheets-Sheet 1

INVENTOR.
FRED M. SIPTROTT.
BY
Wm H. Atkinson
ATTORNEY

Aug. 9, 1966  F. M. SIPTROTT  3,264,827
HYDRO-CENTRIFUGAL POWER UNIT
Filed March 15, 1965  2 Sheets-Sheet 2
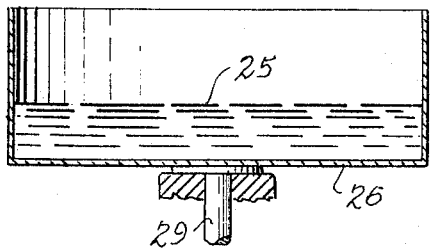
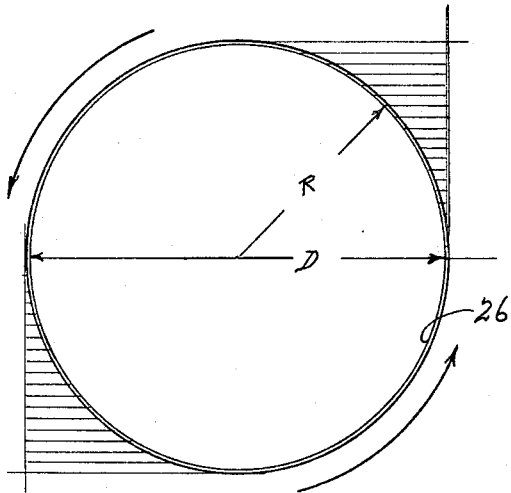
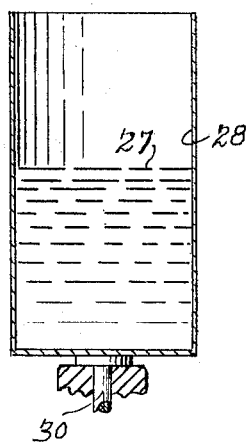
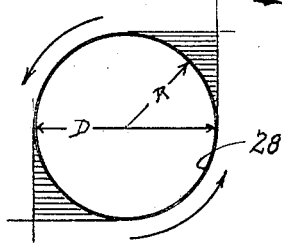
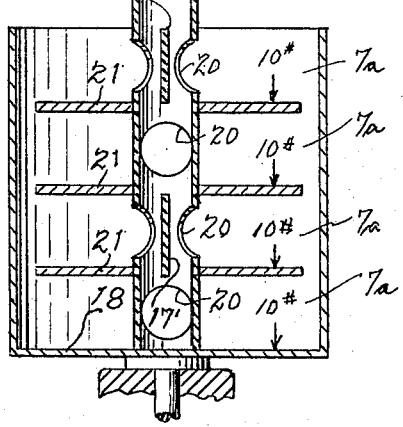
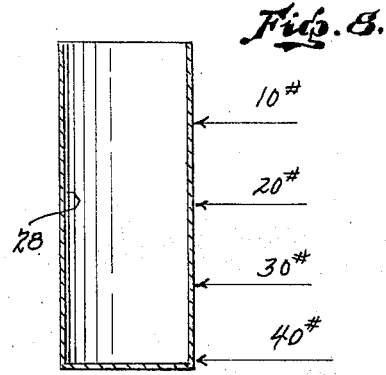
INVENTOR.
FRED M. SIPTROTT.
BY
ATTORNEY.

United States Patent Office 3,264,827
Patented August 9, 1966

3,264,827
HYDRO-CENTRIFUGAL POWER UNIT
Fred M. Siptrott, 3011 Hardies Lane, Santa Rosa, Calif.
Filed Mar. 15, 1965, Ser. No. 439,903
2 Claims. (Cl. 60—54)

My present invention relates to energy producing means and more particularly to a reciprocating hydro-centrifugal power unit having as its primary object the utilization of gravity in its negative stage to produce power. Other objects and advantages would be in part evident to those skilled in the art and in part pointed out hereinafter in the following description taken in connection with the accompanying drawings wherein there is shown by way of illustration and not of limitation a preferred embodiment of the invention.

Figure 1:
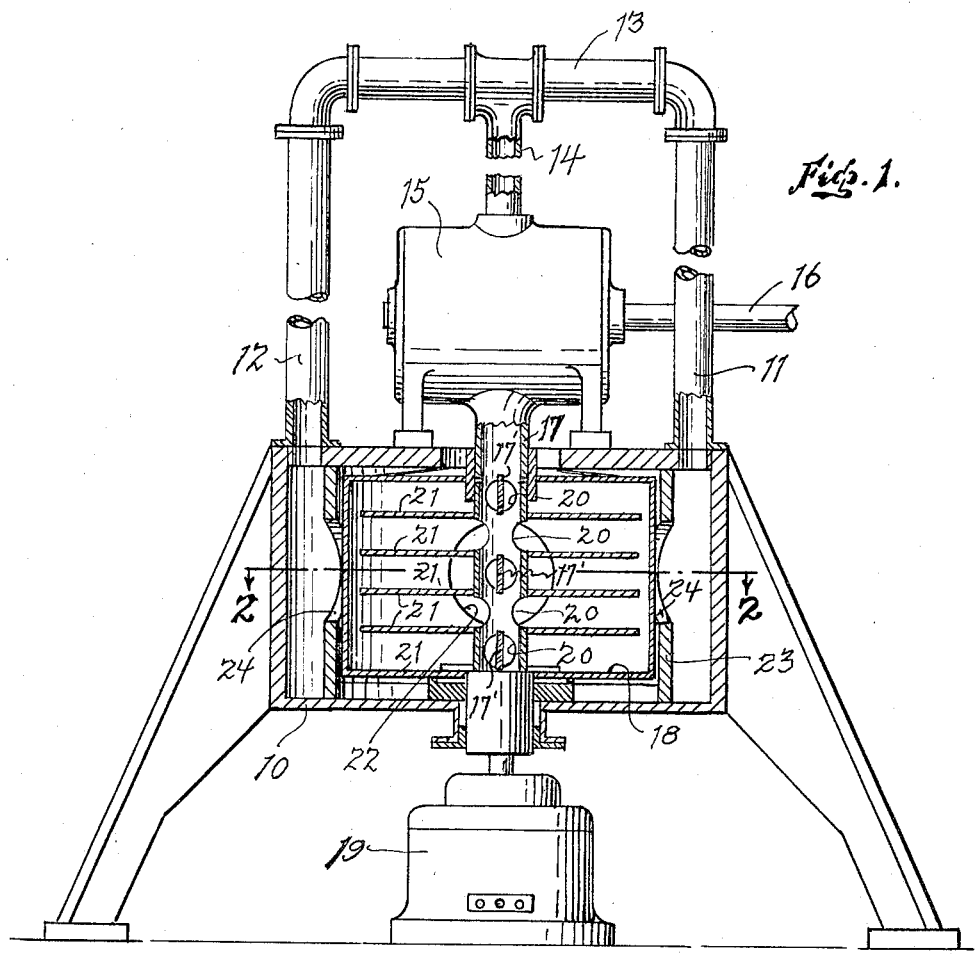
Figure 2:
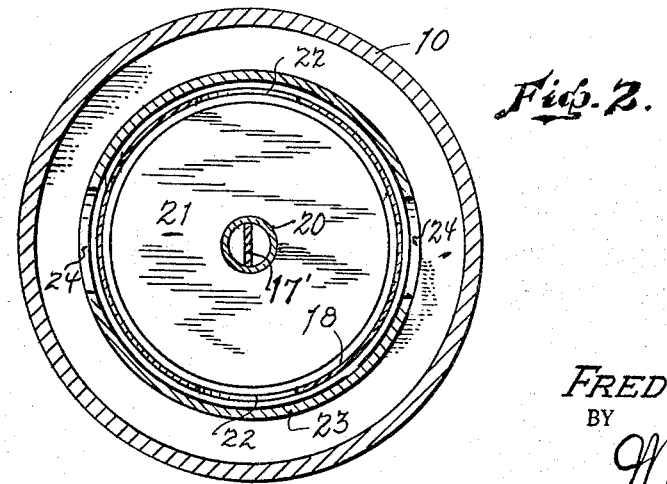

In the accompanying drawing wherein like numerals refer to like parts throughout the several views:

FIGURE 1 is a side view partially in section showing a device constructed in accordance with the invention, FIGURE 2 is a horizontal sectional view taken along line 2—2 of FIGURE 1 looking in direction of arrows, FIGURES 3 and 4 are diagrammatic views illustrating one operating aspect of the invention, FIGURES 5 and 6 are diagrammatic view demonstrating another operating aspect of the invention, and FIGURES 7 and 8 are comparative diagrammatic views to illustrate the functional aspects of the invention.

The purpose of the invention is to demonstrate the utilization of the forces of gravity in a negative sense as demonstrated by a fluid medium subjected to centrifugal force which involves a positive and negative application of the forces of gravity to transmit and produce power. The principal involved is explained by the fact that all positive lines of forces of gravity are severed simultaneously. This could for illustration be compared to a long tightly coupled freight train in which the entire train might be likened to a solid static means which when set in motion would require an equal mass of force with an involved element of time to set the entire train in motion.

To illustrate the principal involved, this invention makes reference to the negative lines of force of gravity by using water as a mass media. This is because water when subject to centrifugal force is subject to both positive and resultant forces of gravity, but is neutral to centripedal force. Therefore if water is moved in a circular motion, the forces of gravity are brought out of balance. This takes place because gravity lines of force on the outside of the circle of motion are progressively extended while the gravity lines of force on the inside of the circle of motion are correspondingly reduced. Therefore since water is subject to gravity but is neutral to centripedal force its mass when rotated about a central axis is pulled to the extended lines of the force of gravity on the outside of the circle and is released by the reduced lines of force of gravity on the inside of the circle.

For a more detailed description of the invention reference is now made to FIGURES 1 and 2 of the drawings, wherein the numeral 10 designates a completely sealed fluid type chamber having two oppositely disposed and upwardly extending standpipes 11 and 12 that are connected through a header 13 with a fluid return conduit 14 through which fluid is projected into a hydraulic turbine 15 having a power output shaft 16. Leading from the turbine 15 there is a downwardly extending conduit 17 through which the circulating fluid is discharged into a prime mover compartment 18 that is turned about the axis of the fluid conduit 17 by an electric motor 19. The extending end of the conduit 17 is provided within the prime mover compartment 18 with spaced oppositely disposed fluid outlets 20 that are successively arranged in right angle relation throughout its length within the compartment 18. This extension of the conduit 17 is provided with slip stream dividers 17' and carries disc like members 21 that operate to separate the flow of fluid through the prime mover compartment 18 into a series of vertically spaced stages as the fluid is discharged through oppositely disposed outlets 22 formed in the sides of the compartment 18. Associated with the prime mover compartment 18 there is a stationary cylinder 23 having two oppositely located openings or ports 24 through which water discharged through the openings 22 of the compartment 18 will be projected in an intermittent or surging manner. This pulsating or surging fluid is then directed by the standpipes 11 and 12, the cross-head 13 and conduit 14 to the turbine 15 for the production of power through the shaft 16 and a return to the compartment 18 for a repetition of the operating cycle.

To explain the difference in, or between the positive lines of force and the resulting lines of force of gravity as suggested above and to demonstrate the potential forces involved in this invention, reference is now made to the remaining figures of the drawings. In FIGURES 3 and 4 there is diagrammatically shown a fluid mass rotating in a large circle and in FIGURES 5 and 6 a similar and equal fluid mass is shown as rotated in a smaller circle. In these showings the mass of FIGURE 3 consists of a quantity of water 25 that is circulated in a cuplike container 26. In FIGURE 5 an equal quantity of water designated by the numeral 27 is circulated in a cuplike container 28 of smaller diameter. The cuplike number 26 has a diameter twice that of the cuplike number 28 and the cuplike number 28 has a height twice that of the cuplike number 26. To impart rotation to the water masses 25 and 27 in a horizontal plane the cuplike numbers 26 and 28 are shown as respectively mounted upon the ends of vertical shafts 29 and 30 that may be driven at the same speed by any suitable means.

In this invention a limited amount of water is placed into a cylinder and is rotated in a circular motion, which motion is parallel to the lines of force of gravity. The extended lines of force of gravity on the outside of the cylinder will act progressively on the total mass of water and build up a constant pressure on the inside of the cylinder walls directly in opposition to centripedal force. This pressure is then tapped intermittently and so changed to kinetic energy. This tapped portion of water will then rise in a riser penstock 11 and 12 high above the water level of the cylinder and then return again through the conduit 14 to compartment 18 doing work on its way down.

The outstanding basic feature in this invention is the fact that a heavy mass of fluid is circulated in a manner to counterbalance the forces of gravity. The only load to be overcome is force required to set the circulating mass into motion. In this manner the water masses 25 and 27 are subject to centrifugal force which is dynamic in nature. The degree of this force is dependent on three things: first, the diameter of the circle; second, the size of the mass involved; and third, the speed or angular velocity of motion.

In the accompanying drawing it is shown that by changing the outside shape or form of a body in relation to gravity but without increasing mass or volume, changes in values take place if that body is turned in a circular motion. FIGURES 7 and 8 of the drawings shows the stages 7a of the cylinder and the cylinder 28 as of identical volumetric dimensions when measured between the discs 21 of FIGURE 7. Their forms in relation to gravity are in an upright series and in a horizontal position respectively. The horizontal discs 21 in FIGURE 1 are employed in my invention and are indicated in FIGURE 7 as a series of single stages of a multi-stage cylinder. For the purpose of showing difference in resulting values when in motion, let us consider that a number of 20 hypothetical lines of force per inch of periphery are employed and not per square inch of area as indicated in FIGURES 4 and 6, the total number of lines of force per inch would be 149 in FIGURE 6 and 298 in FIGURE 4. Numerically the lines of force per square inch are identical while peripherically they are not. Dynamically speaking the lines of force per square inch will react to motion in an additive or parallel fashion, while lines of force per inch of periphery react in an accumulative fashion. If the cylinder in FIGURE 5 is turned at 1000 revolutions per minute, the total lines of force broken or severed would be 149 times 1000 or 149,000. By comparison the same result could be achieved with the cylinder in FIGURE 3 but with only 500 revolutions per minute despite the fact there has been no change in mass. Also the extension of the lines of force on the outside of the cylinder as indicated, in FIGURE 4 of the drawing, is twice as much as the extension of the lines of force on the outside of the cylinder 28 in FIGURE 6. By the same token a hypothetical pull of 100 pounds on the outside of the cylinder in FIGURE 4 would require twice as many revolutions of the cylinder in FIGURE 6. Therefore one can then readily see why a cylinder such as in FIGURE 4 was employed in my invention in a multi-stage setup as shown in FIGURE 7.

Since water pressure in the cylinder 18 of FIGURE 7 is not accumulative in relation to gravity as shown in FIGURE 8, and since the pull of the extended lines of force on the outside of the cylinder is double in value and the action of the lines of force per inch of periphery is accumulative, it was necessary to install so-called slipstream dividers 17' as shown in FIGURES 1 and 7 in order to get maximum efficiency.

The conversion of energy depends on the creation of a complete cycle of motion. The creation of a complete cycle of motion requires two potentials, namely a vertical and a lateral one. Both potentials coupled in series will complete a cycle of motion. When water is used as a media of transmission the forces exerted by both potentials remain static at all times, the mass of water, however, which is subject to these forces at all times does not remain static. By the proposed mechanical arrangement, water is allowed to fall freely through the tube 17 and by contact with the blades of a turbine it will exert the vertical pressure of positive gravity to which it is subject. It will then set the turbine in motion but only if when leaving the turbine it is allowed to disperse itself from a vertical arrangement into a lateral arrangement, thereby creating a free flow. The force of gravity, having exerted pressure on the mass of water once in its vertical or positive stage, are still exerting pressure on the mass of water but in its lateral sense. It is now necessary to redirect the mass of water from its lateral sense of motion to a vertical or positive sense of motion. By means of the mechanical device, in my invention with the rotating cylinder, the total resistance to the pressure of the mass of water in its lateral stage is reduced by concentrating this pressure from a multiple of unit areas to a nominal single area. This simply means that a conversion of force from the lateral to a vertical sense has been effected mechanically. This reduction of resistance against circulation makes it possible to rotate a large mass of water in a cylinder with a small amount of energy. By rotation, the laterally moving mass of water is then subjected to the forces of centrifugation, which in the absence of centripedal force, as is the case wtih water, will pull its mass toward the outside as illustrated in FIGURES 4 and 6 of the drawing and if allowed to escape through portholes as shown at 24 FIGURES 1 and 2, will again build up its mass in a vertical or positive arrangement. By means of riser penstocks as in 11 and 12 of FIGURE 1 it is caused to rise to a point 13 and thus fall down through conduit 14 to complete the cycle. If the reduction of resistance to flow amounts to 90% of the applied force then the resistance would be 10% of the total. Therefore if 90% of this force is necessary to force the water into the vertical arrangement shown and up to its original starting point all the power created in the turbine 15 will be free for useful purposes.

It is believed that the operation of my invention will be clearly understood from the above description and while I have, for the sake of clearness and in order to disclose my invention so that the same can be readily understood, described and illustrated specific forms and arrangements, I desire to have it understood that this invention is not limited to the specific forms disclosed, but may be embodied in other ways that will suggest themselves to persons skilled in the art. It is believed that this invention is new and all such changes as come within the scope of the appended claims are to be considered as part of this invention.

Having thus described my invention what I claim and desire to secure by Letters Patent is:

1. In a hydro-centrifugal power unit with a rotating liquid mass, the combination of a vertically disposed rotatable prime mover compartment adapted and arranged to contain a liquid mass having oppositely disposed ports through which said liquid mass will be discharged by centrifugal force when said prime mover compartment is rotated about its vertical axis, means for rotating said compartment about said vertical axis, an outer surrounding and stationary cylindrical liquid confining partition having ports aligned with and comparable in size to the ports of said rotatable prime mover compartment, a plurality of horizontally disposed discs arranged in vertically spaced relation within said rotatable prime mover compartment, a vertically extending hollow shaft forming a support for said discs and having staggered ports communicating with spaces between said discs, means forming an outer chamber for the reception of water discharge from said prime mover compartment, a plurality of upstanding penstocks through which portions of the liquid mass discharged into said outer stationary cylindrical liquid confining partition will pass to a single downwardly extending conduit, and operate a fluid turbine having a power output shaft connected to and driven by fluid flowing through said downwardly extending conduit, whereby said liquid mass will be caused to circulate through said turbine in a continuous manner and drive said power output shaft.

2. In a hydro-centrifugal power unit utilizing centrifugal force in a rotating liquid mass, the combination of a vertically disposed prime mover compartment adapted and arranged to contain a liquid mass having oppositely disposed ports through which said liquid mass is discharged when said compartment is rotated, means for rotating said compartment about a vertical axis, an outer cylindrical liquid confining repression cylinder having stationary ports comparable with the ports of said compartment, a plurality of horizontally disposed discs arranged in vertically spaced relation within said compartment, a vertical hollow rotatable shaft extending through the disc within said compartment and forming a support for said discs having oppositely disposed ports communicating with the spaces between said discs, means forming an outer chamber, a plurality of upstanding penstocks through which portions of the liquid mass are discharged upwardly through the ports of the repression cylinder will pass to a downwardly extending conduit and to a fluid turbine having a power output shaft, whereby said liquid mass under centrifugal force will be caused to circulate from and back to said prime mover compartment.

References Cited by the Examiner

UNITED STATES PATENTS

| | | | |
|---|---|---|---|
| 223,530 | 1/1880 | Morton | 60—51 |
| 904,533 | 11/1908 | Hauff | 103—101 |
| 2,035,813 | 3/1936 | Johnson | 60—52 |
| 2,124,914 | 7/1938 | Fottinger | 103—101 |
| 3,098,358 | 7/1963 | Paschke | 60—52 |

FOREIGN PATENTS

| | | |
|---|---|---|
| 372,383 | 3/1923 | Germany. |
| 1,131,953 | 6/1962 | Germany. |
| Ad. 2,004 | 1/1887 | Great Britain. |
| 127,780 | 6/1916 | Great Britain. |

EDGAR W. GEOGHEGAN, *Primary Examiner.*